(12) United States Patent  (10) Patent No.: US 8,150,267 B1
Cumbie et al.  (45) Date of Patent: Apr. 3, 2012

(54) OPTICAL INTERCONNECT

(75) Inventors: Michael Cumbie, Corvallis, OR (US);
Jong-Souk Yeo, Corvallis, OR (US);
Robert Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 11/788,268

(22) Filed: Apr. 18, 2007

(51) Int. Cl.
*H04B 10/00* (2006.01)

(52) U.S. Cl. .................. 398/168; 398/169; 398/170

(58) Field of Classification Search ............ 398/82–84, 398/93, 168–170
See application file for complete search history.

(56) References Cited

U.S. PATENT DOCUMENTS

| | | | |
|---|---|---|---|
| 5,874,929 A * | 2/1999 | Opower et al. ............... 345/32 |
| 6,088,151 A | 7/2000 | Robinson |
| 6,636,681 B2 | 10/2003 | Ji et al. |
| 6,724,971 B2 | 4/2004 | Chang |
| 6,897,995 B2 * | 5/2005 | Malthe-Sørenssen et al. ............... 359/295 |
| 6,904,223 B1 | 6/2005 | Fang et al. |
| 2002/0061167 A1 * | 5/2002 | Wu et al. ............... 385/34 |
| 2002/0164146 A1 | 11/2002 | Ji et al. |
| 2003/0076559 A1 * | 4/2003 | Richard et al. ............... 359/123 |
| 2004/0013342 A1 * | 1/2004 | Lucero ............... 385/16 |
| 2004/0037493 A1 * | 2/2004 | Lee et al. ............... 385/18 |
| 2005/0141805 A1 * | 6/2005 | Shiozaki et al. ............... 385/18 |
| 2007/0035843 A1 | 2/2007 | Cassarly |
| 2007/0217735 A1 * | 9/2007 | Cai et al. ............... 385/16 |
| 2008/0030721 A1 * | 2/2008 | Kepler et al. ............... 356/124 |

FOREIGN PATENT DOCUMENTS

| | | |
|---|---|---|
| JP | 2003-195191 | 7/2003 |
| JP | 2005-049742 | 2/2005 |
| WO | WO 2004/023197 A1 | 3/2004 |

* cited by examiner

*Primary Examiner* — Dzung Tran

(57) ABSTRACT

An optical interconnect includes a reflective body having a plurality of faces, where the body is translatable in a plane; and an optical receiver configured to receive optical energy reflected by at least one of the faces.

23 Claims, 12 Drawing Sheets

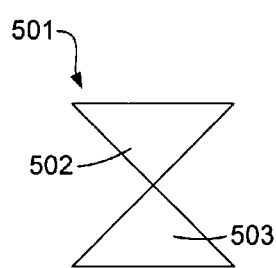
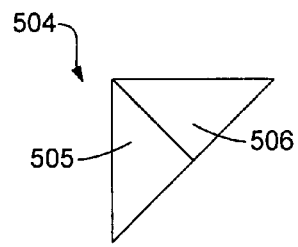
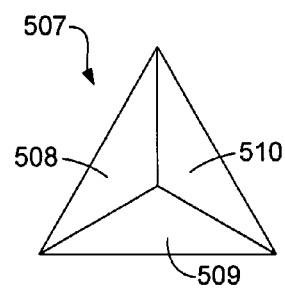
*Fig. 5A*      *Fig. 5B*      *Fig. 5C*
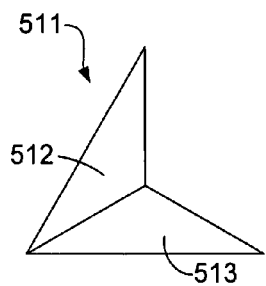
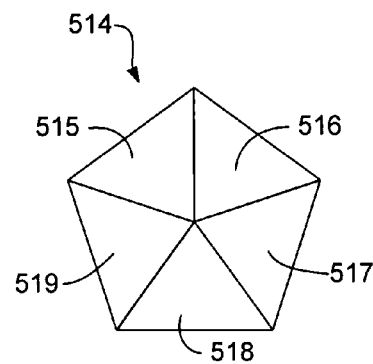
*Fig. 5D*      *Fig. 5E*
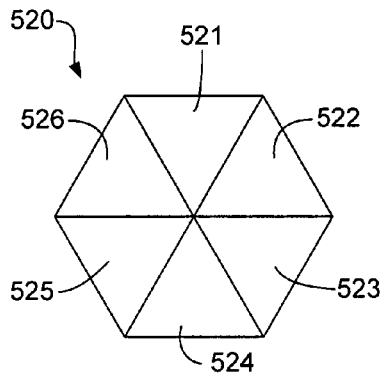
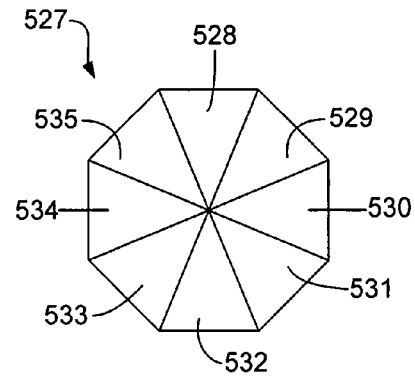
*Fig. 5F*      *Fig. 5G*

OPTICAL INTERCONNECT

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

Systems making use of optical components often rely upon the precise manipulation of optical energy, such as a beam of light, to accomplish a desired task. This is especially true in systems utilizing light for high-speed, low-energy communication between circuit boards. The manipulation of an optical signal may include selectively redirecting the light beam of the optical signal to allow detection of the optical signal by a sensor that does not have a direct line of sight with the optical source or to allow detection of the optical signal by more than one sensor.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 5A is a top view diagram of an exemplary reflective body, according to principles described herein.

FIG. 5B is a top view diagram of an exemplary reflective body, according to principles described herein.

FIG. 5C is a top view diagram of an exemplary reflective body, according to principles described herein.

FIG. 5D is a top view diagram of an exemplary reflective body, according to principles described herein.

FIG. 5E is a top view diagram of an exemplary reflective body, according to principles described herein.

FIG. 5F is a top view diagram of an exemplary reflective body, according to principles described herein.

FIG. 5G is a top view diagram of an exemplary reflective body, according to principles described herein.

Throughout the drawings, identical reference numbers designate similar, but not necessarily identical, elements.

DETAILED DESCRIPTION

Figure 1:
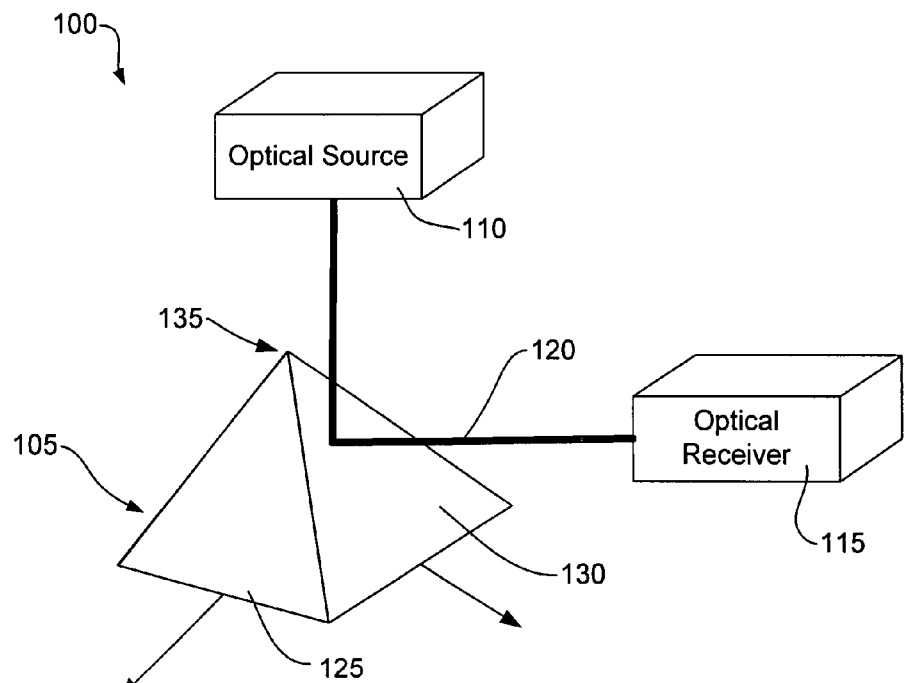
FIG. 1 is a diagram of an exemplary optical interconnect, according to principles described herein.

As noted above, light or optical beams can be use for a variety of purposes, including the transmission of data. In some such systems, the optical beam is directed or redirected into an optical path where it can be detected or received by a designated component. In more complex systems, optical beams may be multiplexed or split to reach detectors or other components in different locations. Consequently, an optical multiplexer or beam splitter may be used as suits a particular application. Furthermore, it may be desirable to minimize optical impedance, interference, and/or distortion in such systems.

To accomplish these and other goals, the present specification discloses apparatus, systems and methods relating to an optical interconnect having a translatable reflective body with a plurality of faces. The optical interconnect enables optical multiplexing, optical routing, optical modulation, and positional sensing, among other functions, with minimal optical impedance, distortion or interference.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "optical interconnect" refers broadly to a component that links portions of an optical pathway along which a light beam is propagating. The optical interconnect may guide or redirect the light beam so that the beam is incident on or reaches an optical component that does not have a direct line of sight to the optical source. Consequently, with appropriate optical interconnects, an optical pathway can be configured with any length or shape as suits a particular application.

As used in the present specification and in the appended claims, the term "optical multiplexer" refers to an apparatus having the ability to selectively direct a light beam or optical energy to one of a plurality of possible optical paths such that the light beam can reach any of several detectors or other components at different locations or in different optical pathways as best suits a particular application.

As used in the present specification and in the appended claims, the term "actuator" refers to an apparatus that impels an object to mechanical action or motion. Examples of actuators as thus defined include, but are not limited to, electric motors, piezoelectric devices, hydraulic arms, and springs. As will be described below, an optical multiplexer described herein includes an actuator for moving a reflective body with a plurality of reflective faces disposed at different angles with respect to the reflective body such that a light beam can be selectively directed in a variety of different directions as the actuator brings different faces of the reflective body into the light beam.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical interconnects, exemplary optical multiplexers, and exemplary methods of utilizing the exemplary optical interconnects.

Exemplary Optical Interconnect

Referring now to FIG. 1, an exemplary optical interconnect (100) is shown. The optical interconnect includes a reflective body (105) that connects a portion of an optical pathway from an optical source (110) with a second portion of an optical pathway leading to an optical receiver (115). In the example of FIG. 1, the reflective body (105) has a substantially polyhedral geometry and includes a plurality of mirrored or reflective faces (125, 130). The reflective faces (125, 130) are arranged in a pyramidal fashion and converge at an apex (135) of the reflective body (105), with each face (125, 130) being disposed at a different angle with respect to the reflective body (105) and the optical pathway. The reflective body (105) is translatable within a plane, which is depicted by the arrows in FIG. 1. A base of the reflective body (105) may lie substantially within the plane.

Figure 2:
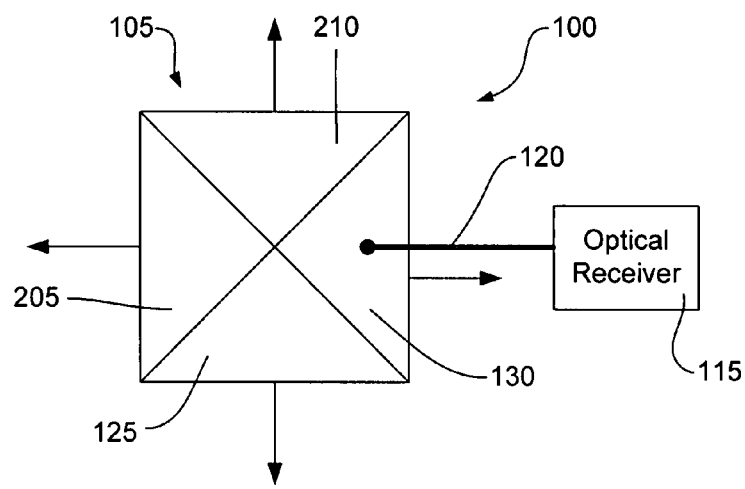
FIG. 2 is a diagram of an exemplary optical interconnect, according to principles described herein.

Referring now to FIG. 2, a top view of the optical interconnect (100) of FIG. 1 is shown, with the optical source (110) removed for clarity. The reflective body (105) of this embodiment has a square pyramid geometry, and therefore has four reflective faces (125, 130, 205, 210) positioned beneath the optical source (110).

The reflective faces (125, 130, 205, 210) are configured to reflect a beam of optical energy (120) originating from an optical source (110) directed toward the reflective body (105) in a direction parallel to the plane in which the reflective body (105) is translatable. As the reflective body (105) of this embodiment has four reflective faces (125, 130, 205, 210) under the optical source (110, FIG. 1), the beam of optical energy (120) may be selectively reflected in any of four different directions parallel to the plane indicated by the arrows.

The direction in which the beam of optical energy (120) is reflected is dependent on which face (125, 130, 205, 210) of the reflective body (105) that is brought into the optical pathway of the light beam exiting the optical source (110, FIG. 1).

As the reflective body (105) is translatable within a plane, as described above, the direction in which the beam of optical energy (120) is directed may be controlled by adjusting the position of the reflective body (105) with respect to the plane.

In the example of FIG. 1, the optical receiver (115) is positioned so as to correspond to a specific reflective face (130) of the reflective body (105) and is configured to receive optical energy (120) reflected by that face (130) from the optical source (110, FIG. 1). The optical receiver (115) may be configured to output an electric signal representative of one or more aspects of the beam of optical energy (120). For example, the optical receiver (115) may produce a data signal bearing data that has been encoded or modulated in the received light beam.

In some embodiments, the optical receiver (115) includes one or more photodiodes. In other embodiments, the optical receiver (115) may include, but is not limited to one or more waveguides, fiber optic material, optical cable, optical detectors, lenses, semiconductors, and combinations thereof.

In the optical interconnect (100) of the present embodiment, only one optical receiver (115) is shown. In this particular embodiment, the optical interconnect (100) may be used to selectively route the beam of optical energy (120) from the optical source (110, FIG. 1) to the optical receiver (115). The beam may be selectively directed toward the optical receiver (115) by selectively translating the reflective body (105) in the plane described above such that the reflective face (130) corresponding to the optical receiver (115) is positioned in the optical pathway and optically coupled with the optical source (110, FIG. 1) so that the light beam is directed by the reflective face (130) to the optical receiver (115).

When it is desired that the optical receiver (115) not receive the beam of optical energy (120), the reflective body (105) may be translated along the plane such that a different reflective face (125, 205, 210) or no reflective face at all is positioned in the optical pathway of the optical source (110, FIG. 1). Consequently, the light beam (120) does not reach the optical receiver (115).

By selectively enabling the optical receiver (115) to receive the beam of optical energy (120), the optical interconnect (100) described herein may be used as an optical switch. In an optical switch, the optical interconnect (100) provides a binary function in which the light beam from the optical source (110, FIG. 1) either is or is not directed to the optical receiver (115). The switch is operated with an actuator that moves the reflective body (105) so that the reflective face (130) is or is not inserted into the optical pathway so as to optically couple the optical source (110, FIG. 1) to the optical receiver (115). Thus, the interconnect (110) functions as a binary optical switch that either couples or decouples the optical pathway between the optical source (110, FIG. 1) and the optical receiver (115).

The optical interconnect (100) described here may also provide an optical modulator. In an optical modulator, the switching function of the interconnect (100) described above is operated so as to encode or modulate a desired digital data stream in the light beam traveling between the optical source (110, FIG. 1) and the optical receiver (115). For example, the actuator may be configured to selectively translate the reflective face (130) of the reflective body (105) in and out of the optical pathway, to optically couple and decouple the optical source (110, FIG. 1) and the optical receiver (115), in a pattern that represents the desired digital data stream. This pattern is detected by the optical receiver (115) which outputs the digital data stream to other components at its location.

Exemplary Optical Multiplexer

Figure 3:
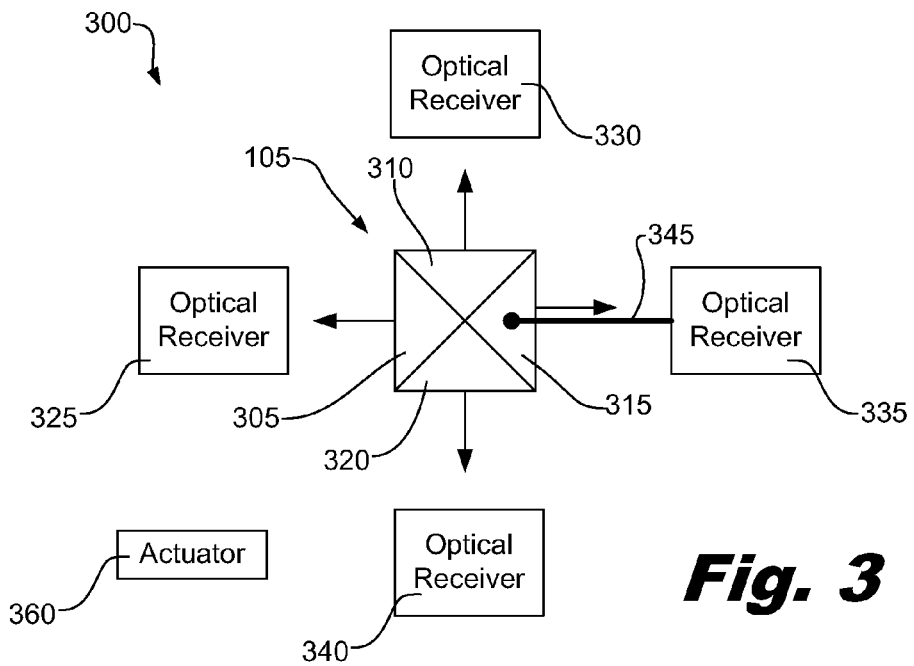
FIG. 3 is a diagram of an exemplary optical multiplexer, according to principles described herein.

Referring now to FIG. 3, a top view of an exemplary optical multiplexer (300) is shown. An optical multiplexer (300) may be formed by using an optical interconnect (100, FIG. 1) similar to that of FIG. 1 including a reflective body (105) having, for example, a square pyramidal geometry. The reflective body (105) may be similar to that described above and shown in FIGS. 1-2.

As shown in FIG. 3, the reflective body (105) is surrounded with a plurality of optical receivers (325, 330, 335, 340). Each of the optical receivers (325, 330, 335, 340) corresponds to one of the reflective faces (305, 310, 315, 320) of the reflective body (105). Consequently, as will be described in more detail below, the reflective body (105) of the multiplexer (300) can selectively direct an optical beam from an optical source (110, FIG. 1) to any of the optical receivers (325, 330, 335, 340). Any of the four receivers (325, 330, 335, 340) will receive the beam from, and be optically coupled to, the optical source (110, FIG. 1) when the reflective face (305, 310, 315, 320) corresponding to that optical receiver is brought into the light beam exiting the optical source (110, FIG. 1).

In some embodiments the optical receivers (325, 330, 335, 340) may be selected from the group consisting of waveguides, fiber optic material, optical cable, photodiodes, optical detectors, lenses, semiconductors, and combinations thereof. For example, one of the optical receivers (325, 330, 335, 340) may be a waveguide channel used to receive unwanted optical energy from an optical source. A separate waveguide channel may be used in this manner to control unwanted optical energy without relying on optical interference. Furthermore, a separate waveguide channel to receive unwanted optical energy may avoid the unwanted effects associated with reflected optical power.

As noted above, the optical multiplexer (300) may be used to selectively direct optical energy (345) from a source to any of the optical receivers (325, 330, 335, 340). One of the optical receivers (325, 330, 335, 340) may be selected to receive the optical energy (345) by optically coupling the face (305, 310, 315, 320) of the reflected body (105) corresponding to the desired optical receiver (325, 330, 335, 340) with the optical energy source. The reflective body (105) is translatable in a plane (indicated by the arrows in FIG. 3), and may be translated to position the desired face (305, 310, 315, 320) so that it is optically coupled with the optical energy source.

To accordingly position the reflective body (105), the optical multiplexer (300) may include an actuator (360) configured to selectively translate the reflective body (105) within the plane. Examples of actuators that may be used to translate the reflective body (105) include, but are not limited to, microelectromechanical systems (MEMS), electric motors, piezoelectric devices, and combinations thereof. In systems where the reflective body (105) is particularly small, one or more MEMs actuators may be especially appropriate to translate the reflective body (105). Suitable MEMs actuators include, but are not limited to, electromagnetic, electrostatic, thermal, and piezoelectric actuator devices. Multiple MEMs devices may be used together for suitable control and translation of the reflective body (105).

An optical multiplexer (300), as shown in this figure, may also be used as a positional sensor to position an object with respect to an optical source. For example, the object to be positioned may have a reflective body (105), as described above, disposed thereon and be translatable with respect to a plane indicated by the arrows, for example, by the actuator (360). When the object and the attached reflective body (105) are positioned with respect to the optical source, data from the set of optical receivers (315, 320, 325, 330) may be used in a feedback loop to control additional translation of the object until the data received from the optical receivers (315, 320, 325, 330) matches, within a tolerance, a predetermined standard indicative of a desired position or alignment. This type of positioning system may be especially be useful in aligning or positioning circuit boards, electronic devices, and the like.

Figure 4:
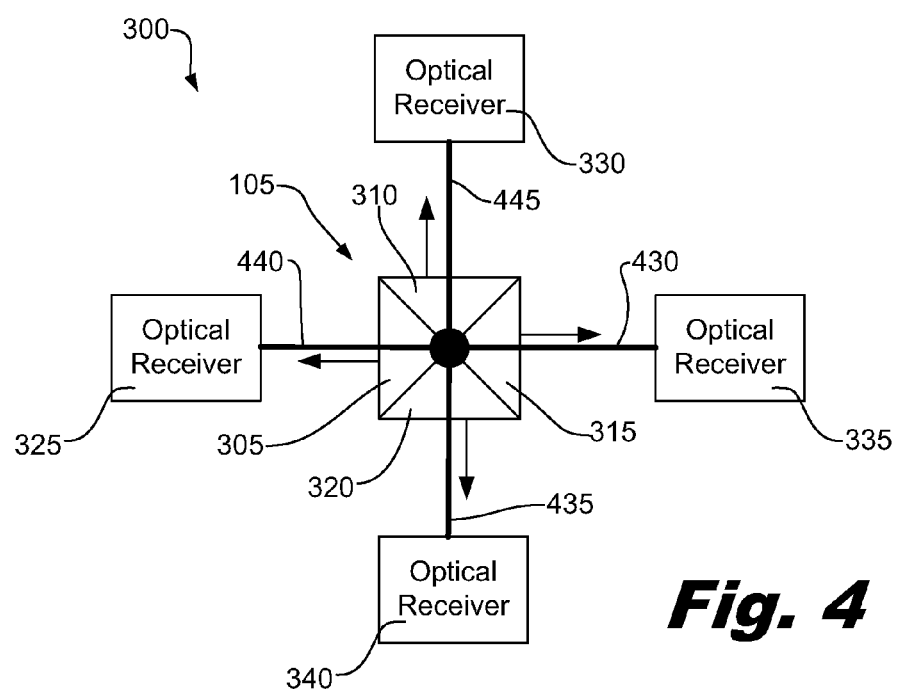
FIG. 4 is a diagram of an exemplary optical multiplexer, according to principles described herein.

This use of the optical multiplexer (300) as a potion sensor will now be further described with reference to FIG. 4. In FIG. 4, a top view of the optical multiplexer (300) is shown. In certain configurations the optical multiplexer (300) may provide functionality as a beam splitter and reflect optical energy received from an optical source simultaneously to a plurality of optical receivers (315, 320, 325, 330). For example, a beam of optical energy (420) from an optical source may be directed to an apex of the reflective body (105) and thereby enable a portion of the beam (420) to be reflected off each face (205, 210, 215, 220) of the reflective body into four separate optical beams (430, 435, 440, 445) to each of the respective corresponding optical receivers (320, 325, 330, 335). In some embodiments, the original beam of optical energy (420) may be directed to two or three, or more optical receivers (315, 320, 325, 330) as desired.

As will be appreciated by those skilled in the art, when the reflective body (105) is positioned such that the apex of the reflective body (105) is directly aligned with a center of the optical source (110, FIG. 1), optical beams of equal intensity will be directed to each of the four optical receivers (320, 325, 330, 335). Consequently, the output of the four optical receivers (320, 325, 330, 335) can be compared to determine whether the reflective body (105) is so positioned and whether the object on which the reflective body (105) is disposed is in a desired position.

If the intensity of the optical beams received from the various optical receivers (320, 325, 330, 335) is unequal, a feedback loop (365) can be drive the actuator (360) to continuing moving the object and reflective body (105) until the desired position is achieved, as indicated by equal optical beams at each of the four optical receivers (320, 325, 330, 335). The feedback loop may also determine, based on which optical receivers (320, 325, 330, 335) are receiving the most optical energy, in which direction the reflective body (105) needs to be moved to achieve the desired positioning. In this way, the optical multiplexer (300) functions as a precision positioning device.

Referring now to FIGS. 5A-5G, top views of varying exemplary polyhedral geometries of reflective bodies (501, 504, 507, 511, 514, 519, 526) are shown. It should be understood that any of a great number of geometries may be used for a reflective body as described in the present specification, and that the reflective bodies (501, 504, 507, 511, 514, 519, 526) shown are merely exemplary. In some embodiments, asymmetrical, non-pyramidal, non-polyhedral, and other geometries are contemplated. Furthermore, some embodiments may include a reflective body having a custom geometry to accomplish specific requirements of an optical interconnect. The geometry of the reflective body can be selected depending on the number and relative locations of the optical receivers or other optical components that need to be selectively optically coupled and by the corresponding shape and configuration of the optical pathways to be implemented.

FIG. 5A shows a reflective body (501) having a partial square pyramidal geometry with two opposing faces (502, 503). FIG. 5B shows a reflective body (504) having a partial square pyramid geometry with two adjacent faces (505, 506). FIG. 5C shows a reflective body (507) having a triangular pyramid geometry with three faces (508, 509, 510). FIG. 5D shows a reflective body (511) having a partial triangular pyramid geometry with two adjacent faces (512, 513). FIG. 5E shows a reflective body (514) having a pentagonal pyramid geometry with five faces (515, 516, 517, 518, 519). FIG. 5F shows a reflective body (520) having a hexagonal pyramid geometry with six faces (521, 522, 523, 524, 525, 526). FIG. 5G shows a reflective body (527) having an octagonal pyramid geometry having eight faces (528, 529, 530, 531, 532, 533, 534, 535).

Exemplary Systems

Figure 6:
FIG. 6 is a diagram of an exemplary optical multiplexer, according to principles described herein.

Referring now to FIG. 6, a side view of an exemplary system (600) is shown. The exemplary system (600) includes first and second circuit boards (605, 610). The second circuit board (610) is positioned beneath the first circuit board (605). The first circuit board (605) includes an optical source (615). The optical source (615) is configured to transmit optical energy (620) to one or more component of the second circuit board (610).

The second circuit board (610) has a reflective body (625) disposed on a surface thereof. The reflective body (625) is translatable within a plane defined by the surface upon which it is disposed. The second circuit board (610) also has a plurality of optical receivers (630, 635) configured to receive optical energy reflected from the different faces of the reflective body (625). Consequently, as discussed herein, the optical energy (620) from the optical source (615) may be selectively routed to any of the various optical receivers (630, 635) by translating the reflective body (625) such that the optical energy (620) is reflected from one of the faces of the reflective body (625) that corresponds to the selected optical receiver or receivers (630, 635).

The optical energy (620) transmitted from the first circuit board (605) to the second circuit board (610) may communicate data to the second circuit board (610). In other embodiments, the optical energy (620) may serve some other function.

Figure 7:
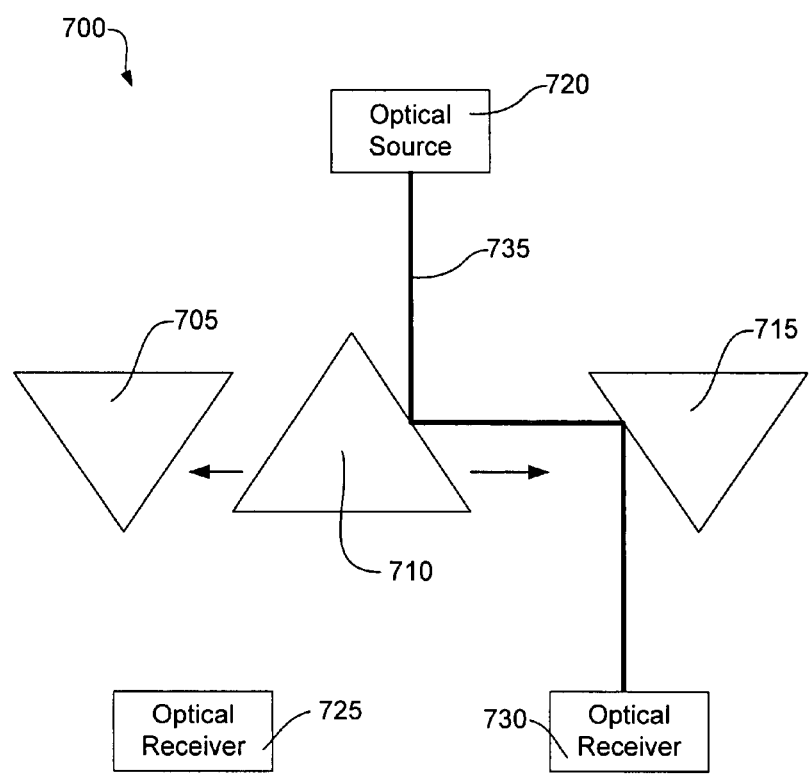
FIG. 7 is a diagram of an exemplary optical multiplexer, according to principles described herein.

Referring now to FIG. 7, an exemplary optical interconnect system (700) is shown. The optical interconnect system (700) includes first, second, and third reflective bodies (705, 710, 715, respectively), an optical source (720), and first and second optical receivers (725, 730, respectively). At least the second reflective body (710) is translatable within a plane defined in part by the arrows shown. The second reflective body (710) is configured to selectively reflect optical energy (735) from the optical source (720) to the first or third reflective body (705, 715), where the optical energy (735) is then reflected to the first or second receiver (725, 730), respectively. The second reflective body (710) may be selectively translated using an actuator, under principles described in conjunction with previous figures. Additionally, the first and third reflective bodies (705, 715) may be translatable within a plane.

Each of the reflective bodies (705, 710, 715) has a number of reflective faces. The embodiment of this figure provides for the routing of a beam of optical energy from the optical source (720), into a plane parallel to the plane in which the second reflective body (710) is translatable, and back out of the plane to an optical receiver (725, 730).

Figure 8:
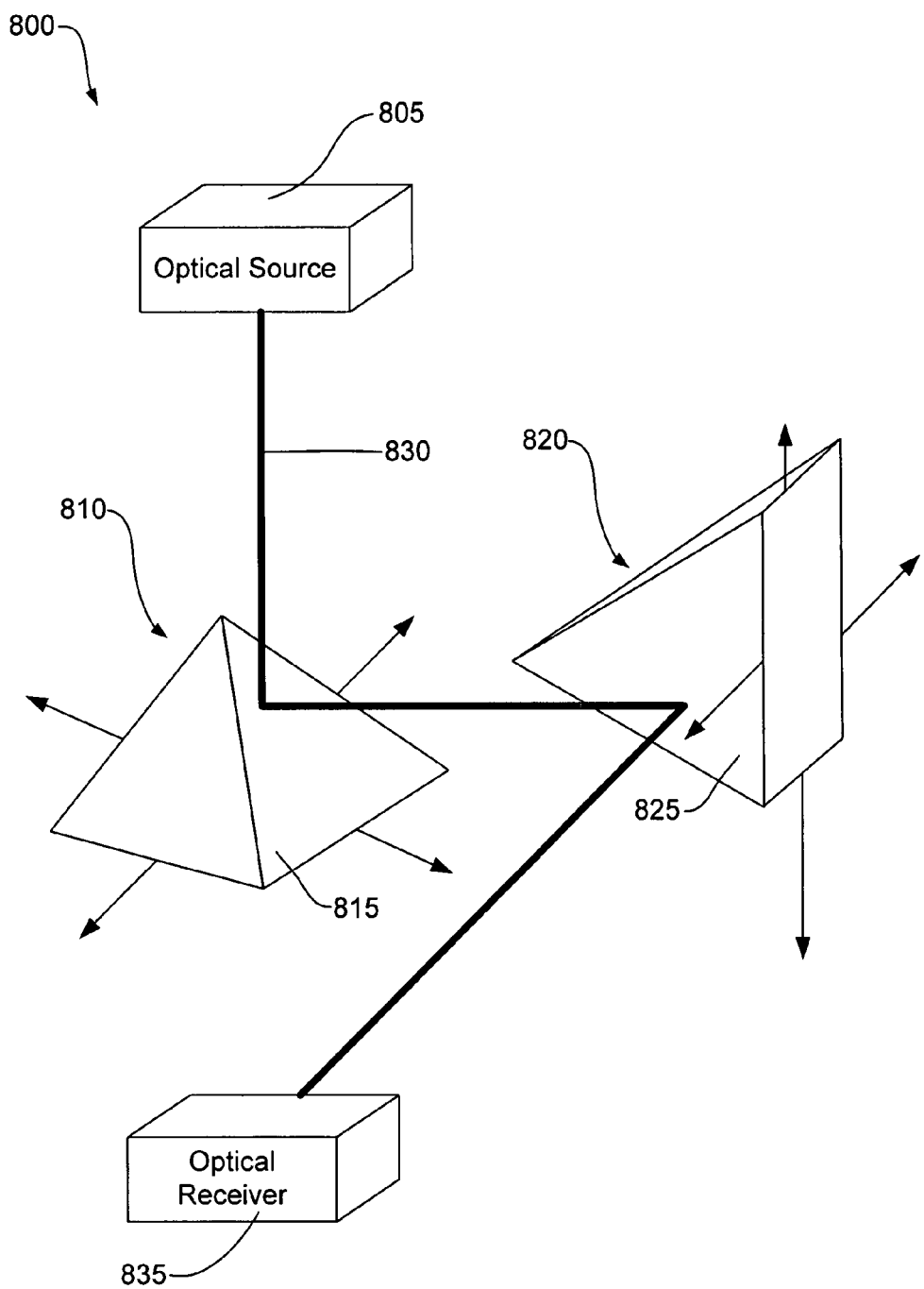
FIG. 8 is a diagram of an exemplary optical interconnect, according to principles described herein.

Referring now to FIG. 8, another exemplary optical interconnect system (800) is shown. The system (800) enables control of an optical pathway and the routing of a beam of optical energy (830) in three dimensions. The optical energy (830) is reflected by a face (815) of a first reflective body (810) to a face (825) of a second reflective body (820). The beam of optical energy (830) is then reflected from that face (825) of the second reflective body (820) to an optical receiver (835). Only two reflective bodies (810, 820) are shown for clarity, but some embodiments may include additional reflective bodies and/or optical receivers and enable three-dimensional optical multiplexing and/or routing. As will be appreciated by those skilled in the art, any number or configuration of the optical interconnect, multiplexer or other elements described herein may be combined as best suits a particular application.

Figure 9:
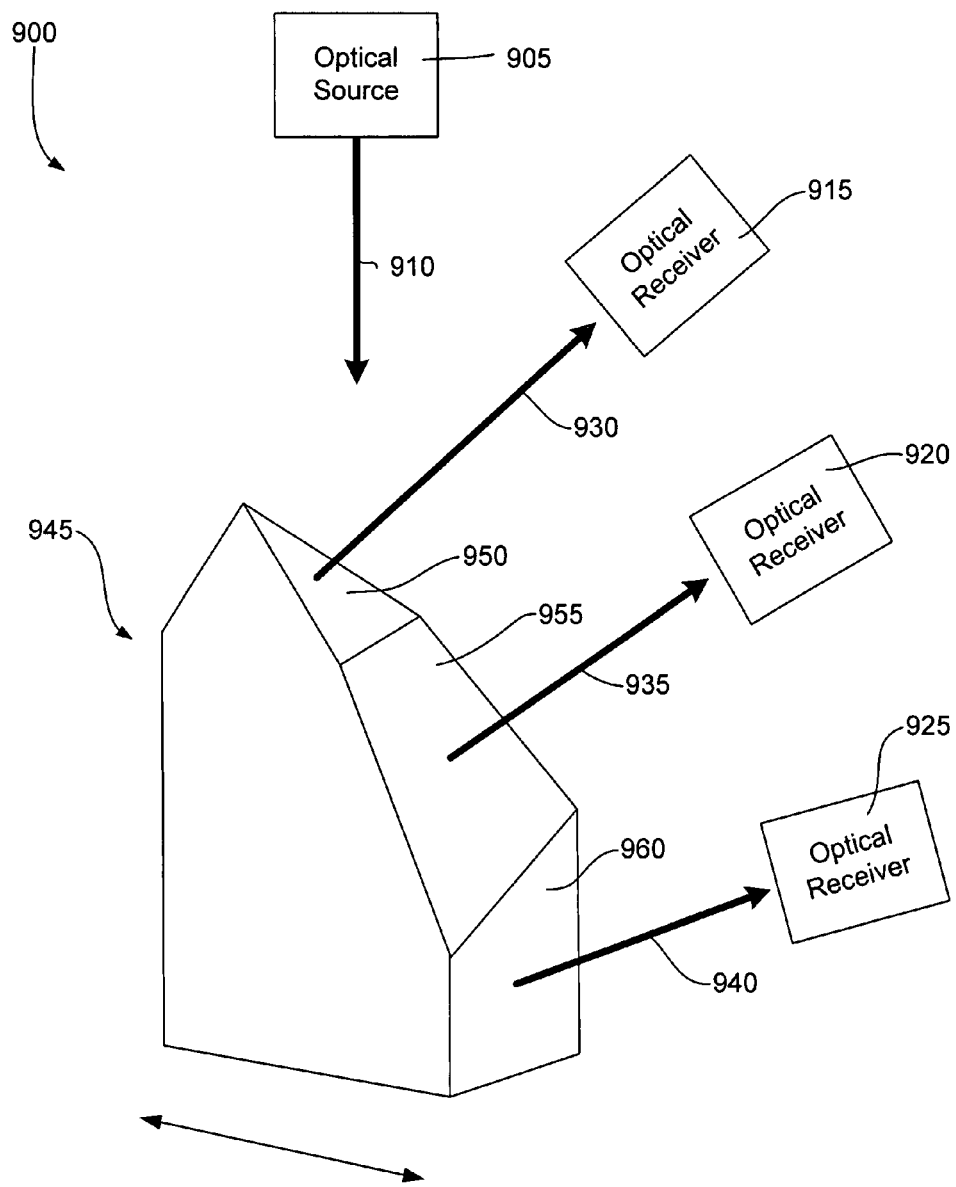
FIG. 9 is a diagram of an exemplary optical interconnect, according to principles described herein.

Referring now to FIG. 9, another exemplary optical interconnect system (900) is shown. In this exemplary optical interconnect system (900), a more complex, angled reflective body (945) may be used in conjunction with an optical source (905) having a multiple solution based on the position of the reflective body (945). Optical energy (910) from an optical source (905) may in this way be simultaneously reflected by a plurality of reflective faces (950, 955, 960) of the reflective body (945), thus directing a plurality of reflected beams of optical energy (930, 935, 940) to corresponding optical receivers (915, 920, 925).

The reflective body (945) is translatable along a line or within a plane indicated by the arrows in FIG. 9. The reflective body (945) may be selectively translated to multiplex data to one or more selected receivers. In some embodiments, the translation of the reflective body (945) may be used to transmit data using a type of on/off modulation as described in detail above. Other embodiments may include additional optical receivers configured to receive optical energy from the optical source according to certain positions of the reflected body (945) along the plane.

Figure 10:
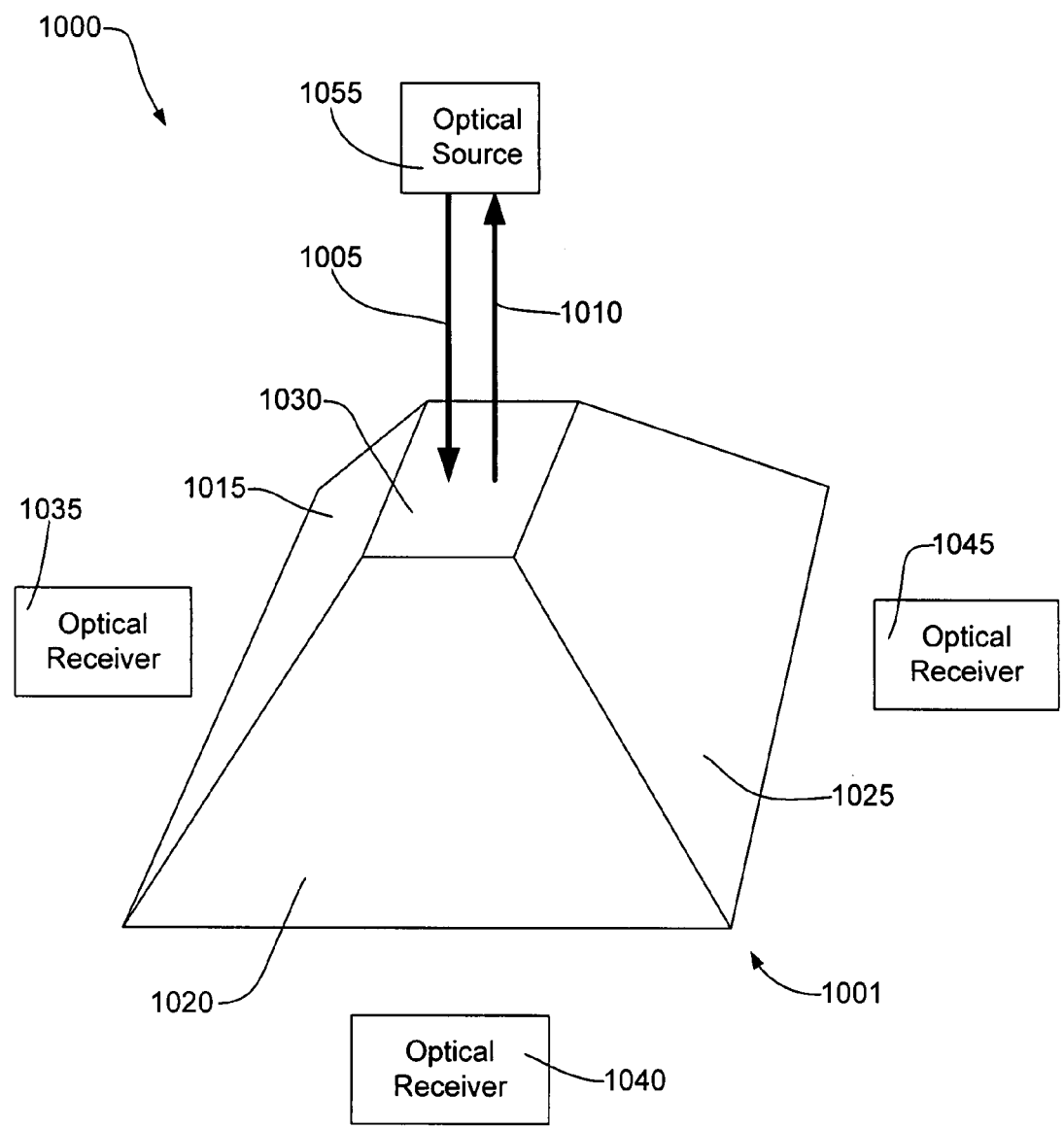
FIG. 10 is a diagram of an exemplary optical interconnect, according to principles described herein.

Referring now to FIG. 10, an exemplary optical interconnect system (1000) is shown. The exemplary system (1000) includes a reflective body (1001) consistent with the principles of the present specification, configured to reflect optical energy from an optical source (1055) off at least one of a plurality of reflective faces (1015, 1020, 1025, 1030) to at least one optical receiver (1035, 1040, 1045).

One particular reflective face (1030) of the reflective body (1001) of the present embodiment is substantially perpendicular to the path of optical energy from the optical source (1055) such that when the optical source is positioned above the reflective face (1030) an incident beam (1005) of optical energy from the optical source (1055) is reflected to the general vicinity of the optical source (1055) as a reflected beam (1010). In some embodiments the optical source (1055) may include an optical receiver.

The reflective body (1001) is translatable along a line or within a plane and may be selectively translated to multiplex data to one or more selected receivers. In some embodiments, a steady state condition of a multiplexer, a positioning system, or other apparatus may occur when the optical source (1055) is positioned over the reflective face (1030) substantially perpendicular to the optical source (1055).

Figure 11:
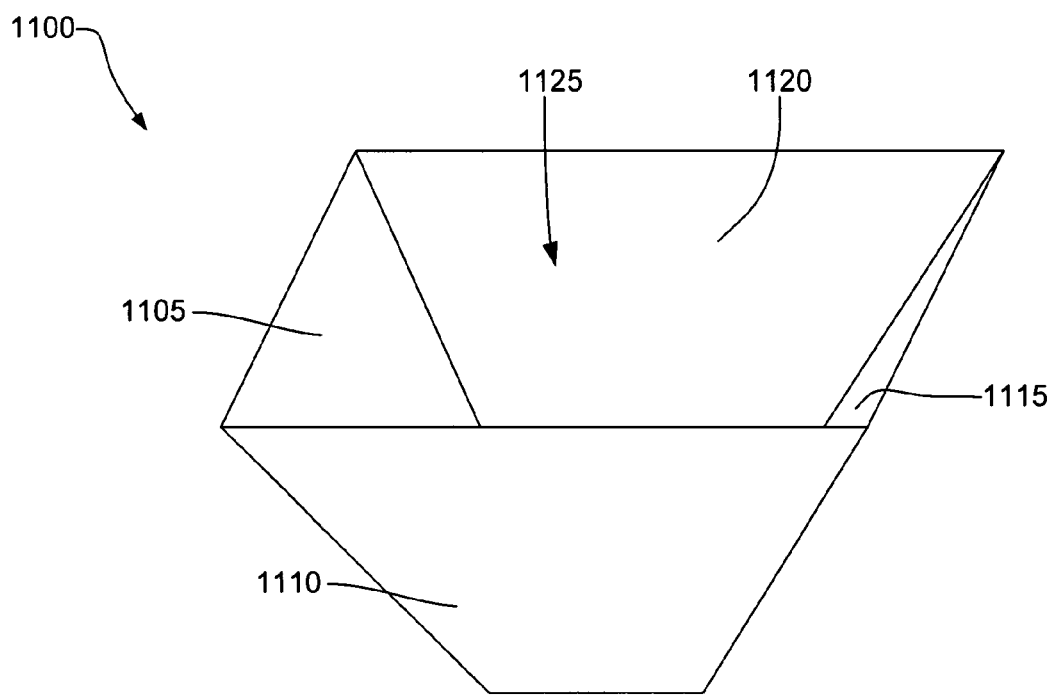
FIG. 11 is a diagram of an exemplary optical interconnect, according to principles described herein.

Referring now to FIG. 11, an exemplary reflective body (1100) consistent with the principles of the present specification is illustrated. The reflective body (1100) has a geometry characterized as an inverted trapezoidal pyramid with a rectangular base. The exemplary reflective body (1100) includes a first, second, third, and fourth reflective faces (1105, 1110, 1115, 1120, respectively), and is translatable along a line or plane, as has been described in detail previously.

Figure 12:
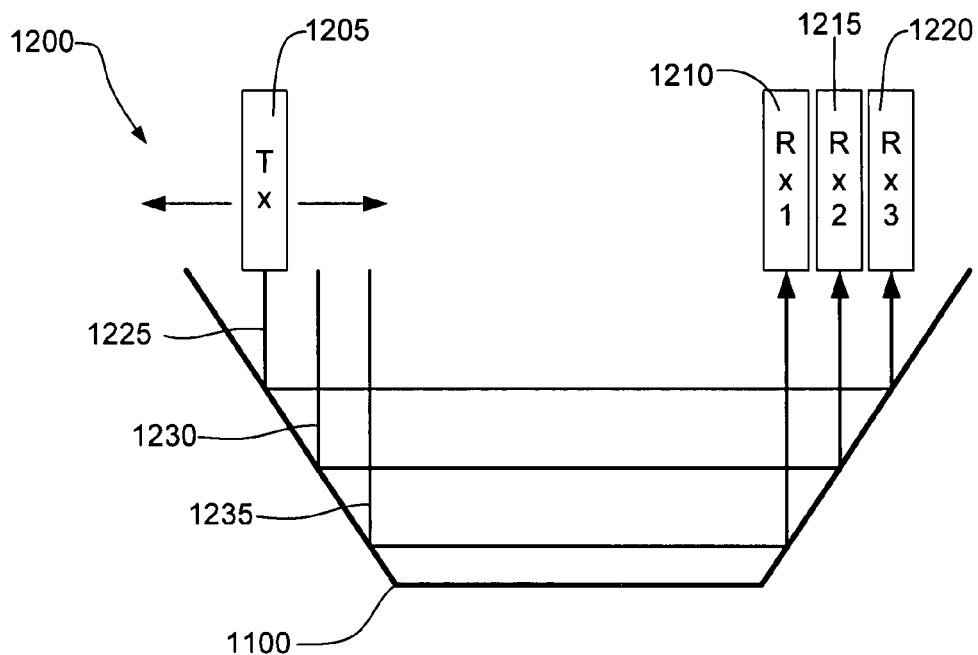
FIG. 12 is a diagram of an exemplary optical interconnect, according to principles described herein.

Referring now to FIG. 12, a side view cutaway illustration of an optical interconnect system (1200) incorporating the reflective body (1100) of FIG. 11 is shown. The optical interconnect system (1200) includes an optical source (1205) and a plurality of optical receivers (1210, 1215, 1220). The reflective body (1100) is translatable along a line or plane as indicated by the arrows in FIG. 12. By selectively translating the reflective body (1100) to different locations within the plane, optical energy (1225, 1230, 1235) from the optical source (1205) may be selectively reflected from any of the faces of the reflective body (1100) and directed to a corresponding optical receiver (1210, 1215, 1220). Optical energy beams (1225, 1230, 1235) illustrate the paths taken by optical energy emitted from the optical energy source (1205) when the reflective body is at different positions within the plane.

Figure 13A:
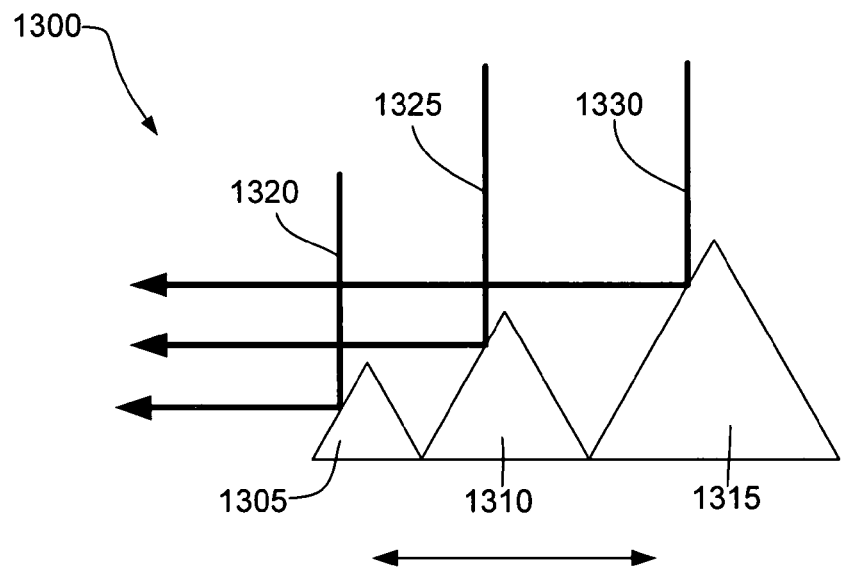
FIG. 13A is a diagram of an exemplary optical interconnect according to principles described herein.
Figure 13B:
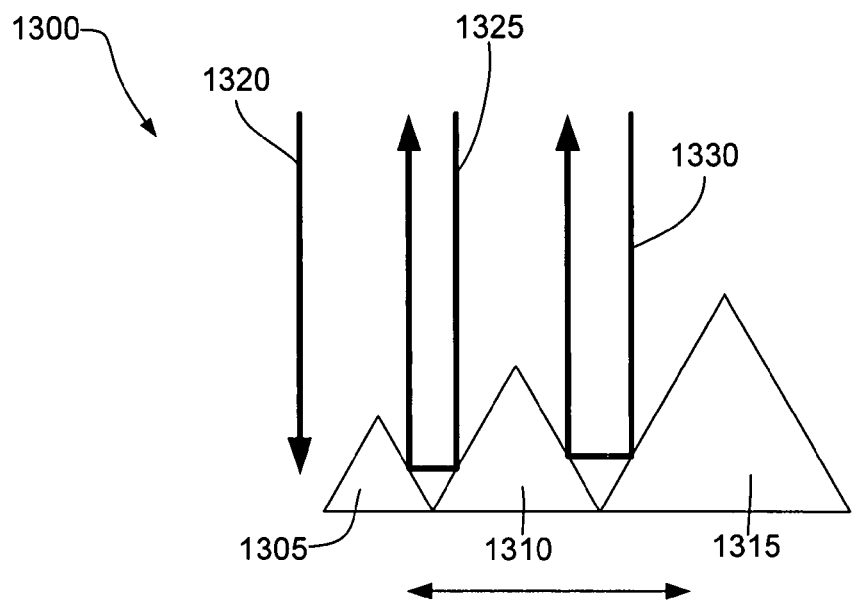
FIG. 13B is a diagram of an exemplary optical interconnect according to principles described herein.

Referring now to FIGS. 13A and 13B, an exemplary optical interconnect system (1300) is shown. The exemplary optical interconnect system (1300) includes a plurality of reflective bodies (1305, 1310, 1315) consistent with the principles of the present specification. The reflective bodies (1305, 1310, 1315) are configured to route a plurality of optical energy beams (1320, 1325, 1330) to a plurality of destinations. The reflective bodies (1305, 1310, 1315) are translatable along a line or within a plane as indicated by the arrows. FIG. 13A shows how optical beams (1320, 1325, 1330) from sources above the reflective bodies (1305, 1310, 1315) are routed when the reflective bodies (1305, 1310, 1315) are in one position along a line, and FIG. 13B shows how the optical beams (1320, 1325, 1330) are routed when the reflective bodies (1305, 1310, 1315) are at another position along the line.

Figure 14:
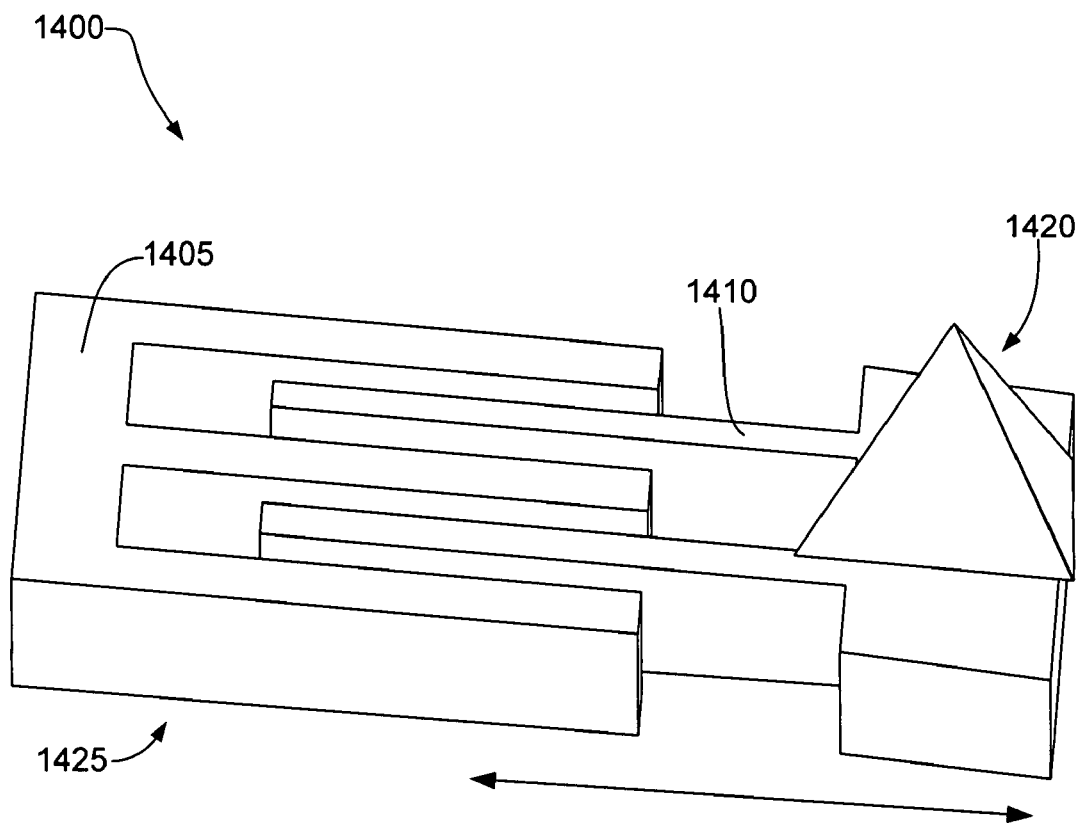
FIG. 14 is a diagram of an exemplary optical interconnect according to principles described herein.

Referring now to FIG. 14, an exemplary optical interconnect system (1400) is shown. The exemplary system (1400) includes a reflective body (1420), consistent with the principles of the present specification, coupled to an exemplary actuator (1425) configured to selectively translate the reflective body (1420) in two opposing directions (indicated by the arrows) within a plane. The actuator (1425) shown is a comb drive electrostatic MEMS having a first piece (1405) and a second piece (1410). The second piece (1410) is configured to selectively move closer to or farther away from the first piece (1405) according to a changing capacitance and a potential difference between the first and second pieces (1405, 1410). In some embodiments, multiple MEMS or other actuator devices may work in conjunction with each other to enable multi-axial motion within the plane.

Exemplary Methods

Figure 15:
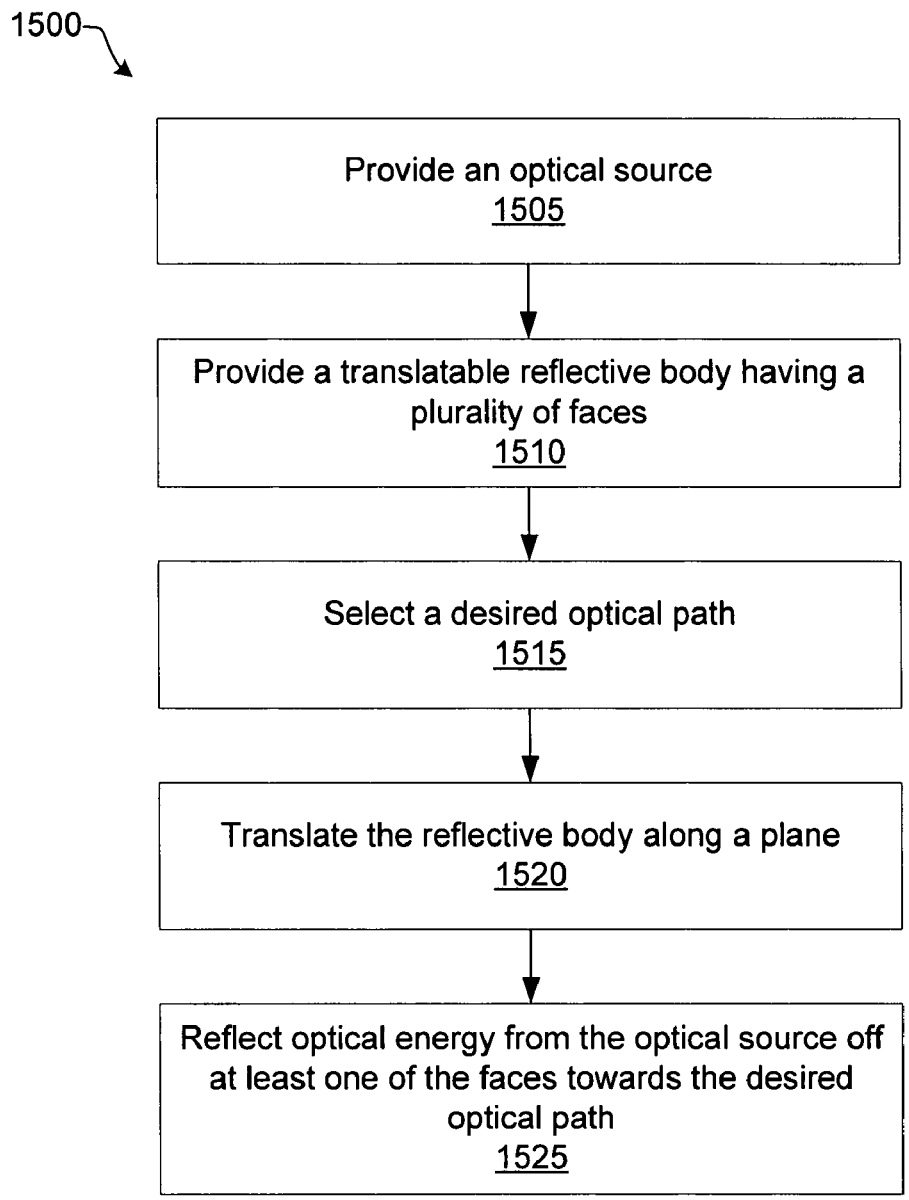
FIG. 15 is a flowchart illustrating an exemplary method of transmitting optical energy, according to principles described herein.

Referring now to FIG. 15, an exemplary method (1500) of operating an optical multiplexer according to principles described herein. The method (1500) includes providing (step 1505) an optical source, providing (step 1510) a translatable reflective body having a plurality of reflective faces, selecting a desired optical path (step 1515), translating the reflective body to a position that couples the optical source to the desired optical path (step 1520), and reflecting (step 1525) optical energy from the optical source from at least one of the faces towards the desired optical path.

In some embodiments, the reflective body may have a substantially polyhedral geometry, such as a pyramidal geometry. Furthermore, at least one of the faces of the reflective body may be mirrored. The step of selecting a desired optical path (step 1515) may include selecting at least one desired optical receiver. Additionally, the step of translating the reflective body along (step 1520) may include activating an actuator, such as a MEMS actuator or an electric motor.

Figure 16:
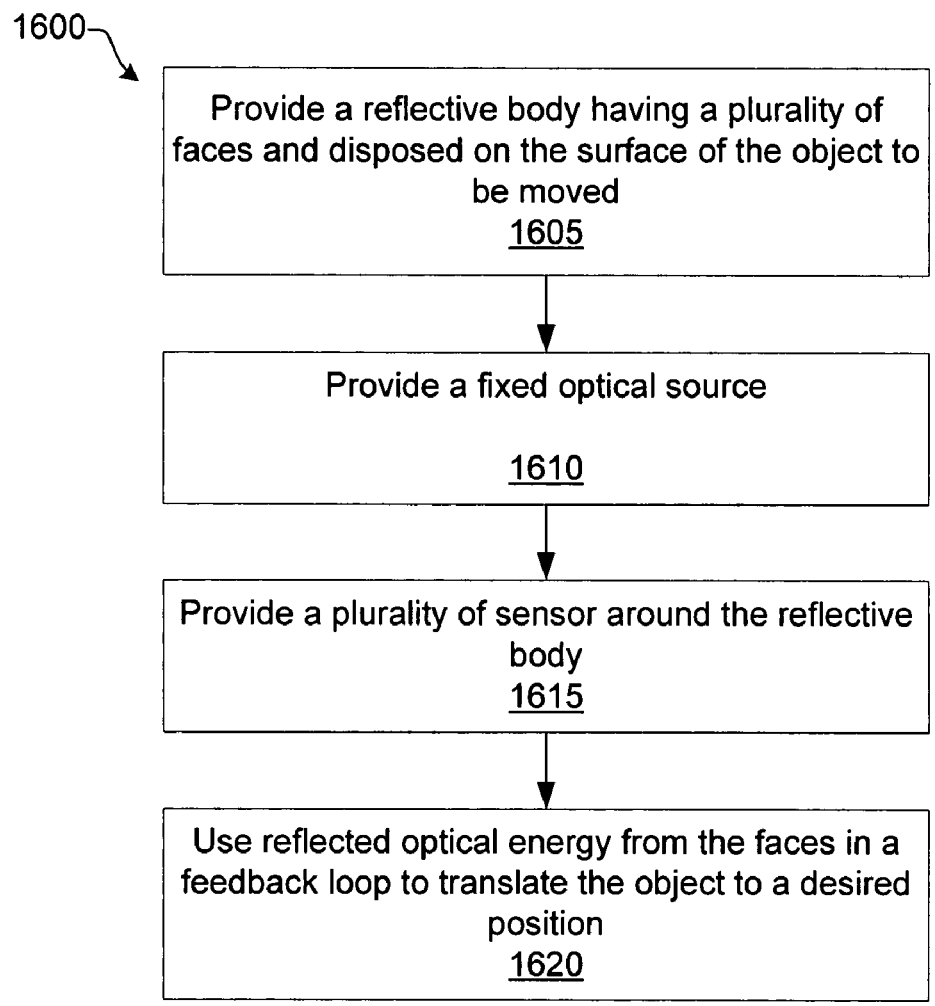
FIG. 16 is a flowchart illustrating an exemplary method of positioning an object, according to principles described herein.

Referring now to FIG. 16, an exemplary method (1600) of positioning an object is shown. The method (1600) includes providing (step 1605) a reflective body having a plurality of reflective faces and disposed on the surface of the object to be positioned. A fixed optical source is also provided (step 1610). The fixed optical source corresponds to the desired position of the object bearing the reflective body. Thus, the object bearing the reflective body is positioned relative to the fixed optical source.

Next, a plurality of sensors is provided (step 1615) around the reflective body. For example, the sensors may all be equidistant from the reflective body and positioned to receive a reflected light beam from a corresponding face of the reflective body. Reflected optical energy from the faces of the reflective body is then used in a feedback loop to translate the object to a desired position.

As described above, the intensity of the optical beam received at the various optical sensors is compared to determine the relative positioning between the optical source and the reflective body (determination 1620). If, for example, the reflective body is aligned with a center of an optical axis of the optical source (determination 1620), the quantity of optical energy distributed to the various optical sensors by the reflective body will be or become equal, perhaps within an allowed tolerance. In some configurations, this will indicate that the reflective body is directly underneath the fixed optical source.

If the sensor indicate that the reflective body is aligned as desired with the optical source (determination 1620), then the positioning is completed. If, however, the sensors do not indicate that the reflective body is aligned as desired with the optical source (determination 1620), the output of the sensors is used in a feedback loop, as described in more detail above, to determine how to further translate the object and reflective body (step 1630). This process repeats until the desired position of the reflective body with respect to the optical source is indicated by the output from the array of optical sensors (determination 1620).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical interconnect, comprising:
a single, unitary reflective body having a plurality of reflective faces thereon, wherein said body is translatable in a plane;
a plurality of optical receivers for receiving optical energy reflected by at least one of said faces;
an actuator configured to selectively translate said body in said plane to position said body in said plane based on which of the optical receivers is selected to receive optical energy.

2. The optical interconnect of claim 1, wherein said reflective body comprises a substantially polyhedral geometry.

3. The optical interconnect of claim 2, wherein at least one of said plurality of faces is mirrored.

4. The optical interconnect of claim 1, wherein said optical receiver comprises a waveguide or optical detector.

5. The optical interconnect of claim 1, wherein said reflective body is configured to reflect optical energy toward said optical receiver when selectively optically coupled with an optical source by translating said body in said plane.

6. The optical interconnect of claim 1, wherein said actuator is selected from the group consisting of micro electromechanical systems (MEMS), electric motors, piezoelectric devices, and combinations thereof.

7. The optical interconnect of claim 1, wherein at least one of said faces is configured to receive optical energy at an angle to said at least one face and reflect said optical energy in a direction parallel to said plane.

8. An optical modulator, comprising:
an optical interconnect as defined in claim 1, wherein said actuator selectively translates said reflective body to selectively reflect optical energy to said optical receiver in a manner that encodes data into a beam of said optical energy.

9. The optical interconnect of claim 1, in which said reflective faces converge at only a single point;
 said interconnect further comprising an optical source spaced apart from and directed toward said point of said unitary body;
 wherein said actuator selectively translates said unitary reflective body in a plane so as to bring one of said reflective faces into a beam emitted by said optical source to deflect that beam to one of said optical receivers selected to receive the beam, where each of said optical receivers corresponds to one of said reflective faces and will receive the beam when that corresponding reflective face is translated into the beam.

10. The optical interconnect of claim 1, in which said reflective faces intersect at only a single point.

11. The optical interconnect of claim 1, in which said reflective faces form a pyramid shape having at least three sides that converge to a single point.

12. The optical interconnect of claim 1, wherein said actuator translates said body laterally within said plane.

13. A method of transmitting optical energy, said method comprising:
 providing a translatable reflective body that is a single, unitary body having a plurality of faces;
 selecting a desired optical path;
 translating said reflective body along a plane such that optical energy external to said reflective body is reflected by at least one of said faces into said desired optical path;
 actuating the translation of said reflective body in said plane, and
 controlling the actuation to position said reflective body in said plane based on which of said faces is selected to reflect optical energy into said desired optical path.

14. The method of claim 13, wherein said reflective body comprises a substantially polyhedral geometry.

15. The method of claim 13, wherein at least one of said faces is mirrored.

16. The method of claim 13, wherein said method further comprises providing an optical energy source.

17. The method of claim 13, wherein said step of selecting a desired optical path comprises selecting at least one desired optical receiver.

18. The method of claim 13, wherein said step of translating said reflective body along a plane includes activating a single actuator to translate said single, unitary body and thereby simultaneously reposition all of said plurality of faces.

19. The method of claim 13, wherein said translating comprises sliding said reflective body laterally within said plane.

20. A method of positioning an object, wherein said object is translatable within a plane, said method comprising:
 providing a single, unitary reflective body disposed on said object, said body having a plurality of faces that intersect at only a single point;
 providing a fixed optical source; and
 using reflected optical energy from said faces in a feedback loop to translate said object to a desired position.

21. The method of claim 20, further comprising the step of providing a plurality of sensors disposed around said reflective body.

22. The method of claim 20, wherein said reflective body is aligned with an optical axis of said optical source at said desired position.

23. The method of claim 20, further comprising the step of activating an actuator to translate said object to said desired position.

* * * * *